(12) United States Patent
Ginzboorg et al.

(10) Patent No.: US 6,947,535 B2
(45) Date of Patent: Sep. 20, 2005

(54) SERVICE CONTROL IN A TELECOMMUNICATIONS NETWORK

(75) Inventors: Philip Ginzboorg, Espoo (FI); Sirpa Kuisma, Espoo (FI)

(73) Assignee: Nokia Corporation, Espoo (FI)

( * ) Notice: Subject to any disclaimer, the term of this patent is extended or adjusted under 35 U.S.C. 154(b) by 661 days.

(21) Appl. No.: 09/837,962

(22) Filed: Apr. 17, 2001

(65) Prior Publication Data

US 2002/0169712 A1 Nov. 14, 2002

Related U.S. Application Data

(63) Continuation of application No. PCT/FI99/00856, filed on Oct. 18, 1999.

(30) Foreign Application Priority Data

Oct. 19, 1998 (FI) .................................................. 982259

(51) Int. Cl.⁷ .............................................. H04M 3/42
(52) U.S. Cl. .............................. 379/201.01; 379/114.03; 379/116
(58) Field of Search ...................... 379/114.03, 201.01, 379/208.01, 116

(56) References Cited

U.S. PATENT DOCUMENTS

| | | | |
|---|---|---|---|
| 4,706,275 A | 11/1987 | Kamil | |
| 5,181,107 A | 1/1993 | Rhoades | |
| 5,524,142 A | 6/1996 | Lewis et al. | |
| 5,748,720 A | 5/1998 | Loder | |
| 5,802,156 A | 9/1998 | Felger | |
| 5,909,485 A | 6/1999 | Martin et al. | |
| 6,266,401 B1 * | 7/2001 | Marchbanks et al. | 379/116 |
| 6,337,903 B1 | 1/2002 | Manner | |
| 6,381,316 B2 * | 4/2002 | Joyce et al. | 379/114.2 |
| 6,741,686 B2 | 5/2004 | Bekkevold et al. | |
| 6,760,417 B1 | 7/2004 | Wallenius | |

FOREIGN PATENT DOCUMENTS

| | | |
|---|---|---|
| EP | 0794651 A1 | 9/1997 |
| JP | 9-44576 | 2/1997 |
| JP | 9-312708 | 12/1997 |
| JP | 10-187267 | 7/1998 |
| JP | 10-269290 | 10/1998 |
| WO | WO 95/30317 | 11/1995 |
| WO | WO 96/17466 | 6/1996 |
| WO | WO 98/21676 | 5/1998 |
| WO | WO 99/07108 | 2/1999 |
| WO | WO 00/19700 | 4/2000 |
| WO | WO 00/28746 | 5/2000 |
| WO | WO 00/65820 | 11/2000 |
| WO | WO 01/06753 | 1/2001 |
| WO | WO 01/17222 | 3/2001 |
| WO | WO 01/60046 | 8/2001 |

* cited by examiner

Primary Examiner—Ahmad F. Matar
Assistant Examiner—Rasha Al-Aubaidi
(74) Attorney, Agent, or Firm—Squire, Sanders & Dempsey L.L.P.

(57) ABSTRACT

The invention relates to service control in a telecommunications network which includes customer terminals (CT) and servers (SP) for offering services to the customers. The service is provided by transmitting information to the customer terminal, and the customer pays for the service by sending payment messages. To achieve a versatile control system for controlling the provision of the service, the system maintains a control parameter whose value is dependent (1) on the service price and on the moments of change in the service price, and (2) on the payments made and on the moments in time that the payments are made. The value of the control parameter is compared to a threshold (TT), and the provision of the service is stopped when the value of the control parameter has reached the threshold.

24 Claims, 10 Drawing Sheets

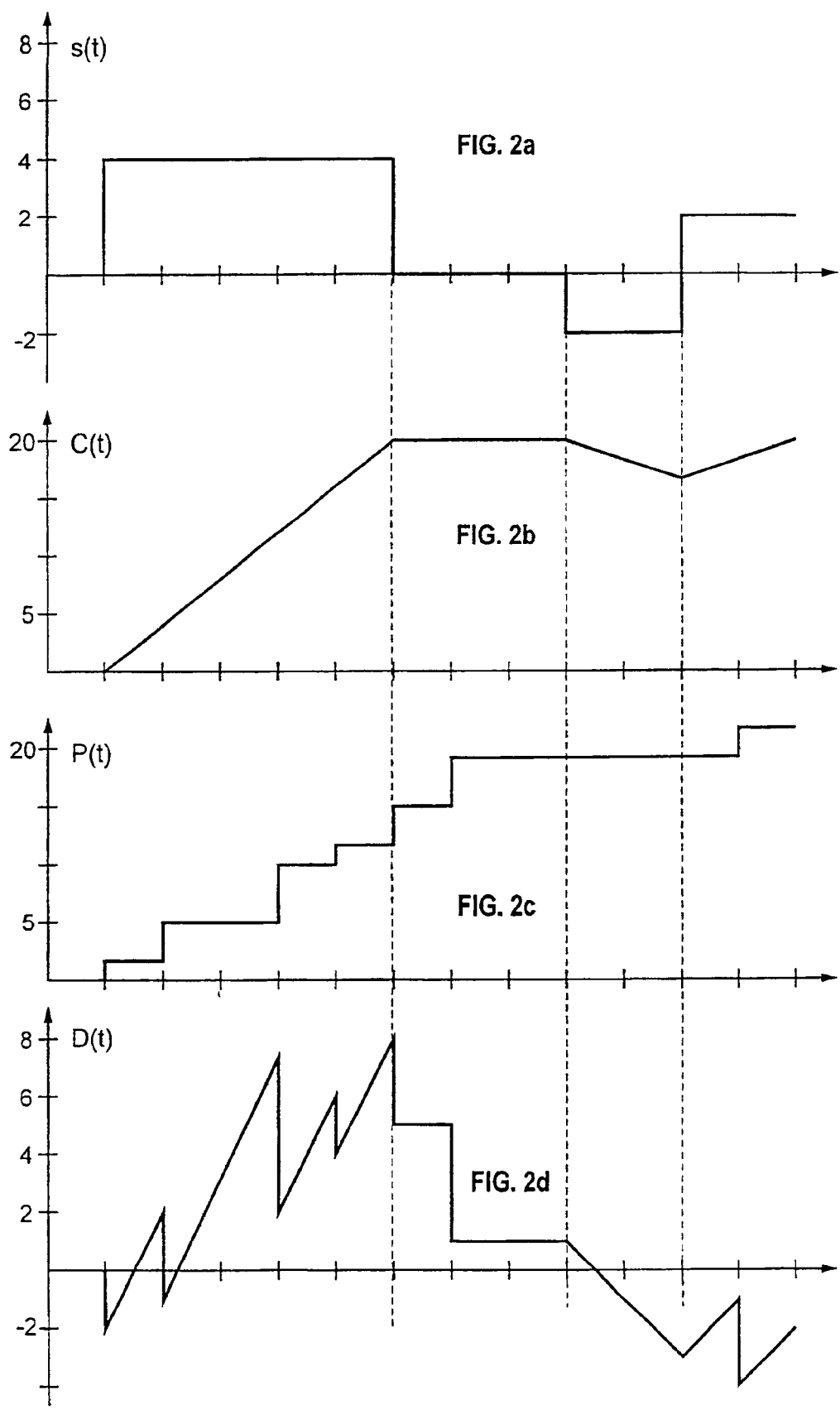

SERVICE CONTROL IN A TELECOMMUNICATIONS NETWORK

This application is a continuation of international application Ser. No. PCT/FI99/00856, filed 18 Oct. 1999.

FIELD OF THE INVENTION

The invention is related in general to the implementation of service control in a telecommunications system. In this context the term 'service' refers to any information service that can be delivered over a telecommunications network to one or more customers (i.e. to one or more users of the services available through the network). The delivery may be a single or one-off event or it may stretch over a longer period of time. Typical examples of the services are mentioned later.

BACKGROUND OF THE INVENTION

If a service provided to a customer is considered a single or one-off event, it is natural to pay for it through a single transaction. The transaction may be performed using one of a variety of known mechanisms, such as electronic money or electronic purse, or the Secure Electronic Transaction (SET) protocol specified by credit card companies for making network payments.

On the other hand, if the service is continuous, it is to the advantage of the customer to pay for it in small increments, for example, once a minute for the next minute of service. With incremental payments the customer's losses remain small if delivery is interrupted; the loss is confined to the prepaid amount. Such an interruption may be intentional or unintentional. For example, in the middle of a the transmission of a movie the customer may decide to terminate the viewing, or there may be congestion in the network, which interrupts the delivery of the service.

Two problems have to be solved in order to control the delivery of a continuous service based on a sequence of received payments: (1) how to prevent theft and forgery of payments, and (2) how to implement a control mechanism by which the service provider is able to implement a decision to terminate the service.

The first of said problems can be addressed so that the customer terminal provides the payment messages with sequence numbers and adds a digital signature to each payment message. By checking the signature and the sequence number the service provider can easily detect payment messages that have been altered or duplicated during transmission; those messages are discarded. Digital signatures protect not only the customer but also the service provider: the customer cannot later repudiate a payment that has reached the service provider intact. A charging system utilizing digital signatures is described, for example, in an earlier PTC patent application PCT/FI97/00685 filed by the same applicant.

The solution to the second of said problems should be a control mechanism that can function in internetwork environments (such as the Internet), where the regular arrival of payments cannot be relied on, due, for example, to variations in the network delay and lost messages. Therefore, the effect of the network on the performance of the control mechanism in relation to the customer must be minimized. In the customer-centric atmosphere, which prevails today, both the customers and the service providers expect that the customers can be treated individually, depending on the relationship that an individual customer has with the service provider. Thus, the mechanism should allow the service provider to offer personalized customer service. The mechanism should also be flexible so that it can be adjusted to various applications and environments.

SUMMARY OF THE INVENTION

The purpose of the invention is to provide a solution to said second problem by creating a control mechanism which satisfies the above-mentioned requirements.

These objectives can be attained by means of the solution defined in the independent patent claims.

The idea of the invention is to maintain at least one control parameter which is dependent on the service prices that have been effective at least during the current service session and which also describes the way in which the customer has made payments up to the current time. The value of the control parameter is calculated and compared to at least one threshold to determine if the service can be allowed to continue or if some other measures should be taken, for example if the customer should be notified of the current situation. The value of the threshold can depend on a number of variables, for example on the behaviour of the customer during the current session (i.e. on one or more control parameters) and/or during one or more of previous sessions.

A control system in accordance with the invention can be adapted to various kinds of technical and business environments and the customers can be treated fairly even if some of the payments made by the customers are lost or they are delayed in the network. The system also allows personalized customer service which can be offered in accordance with the nature and quality of each customer relationship.

According to a preferred embodiment of the invention a control parameter can represent the debt incurred by the customer or the amount of time that the customer has been in debt to the service provider. In this way the control mechanism can measure the activity of the customer and decide whether any control measures are necessary or whether the customer should be sent a notification.

A further advantage of the invention is that it is suitable for compound services consisting of several independent information flows and for multicast services in which one information flow is transmitted to several customers.

The method is also scalable in terms of capacity and geographical coverage.

A BRIEF DESCRIPTION OF THE DRAWINGS

The invention and its preferred embodiments are described in more detail below, with reference to FIGS. 1 through 12 using examples depicted in the following drawings, where:

FIG. 2a shows the service price per time unit as a function of time;

FIG. 2b shows the accumulated charges related to the service when the service price varies according to FIG. 2a;

FIG. 2c shows an example of accumulated payments received from the customer;

FIG. 2d shows the amount of unpaid service, i.e. the debt incurred by the customer, as a function of time, when the accumulated charges and payments vary according to FIGS. 2b and 2c;

Figure 6:
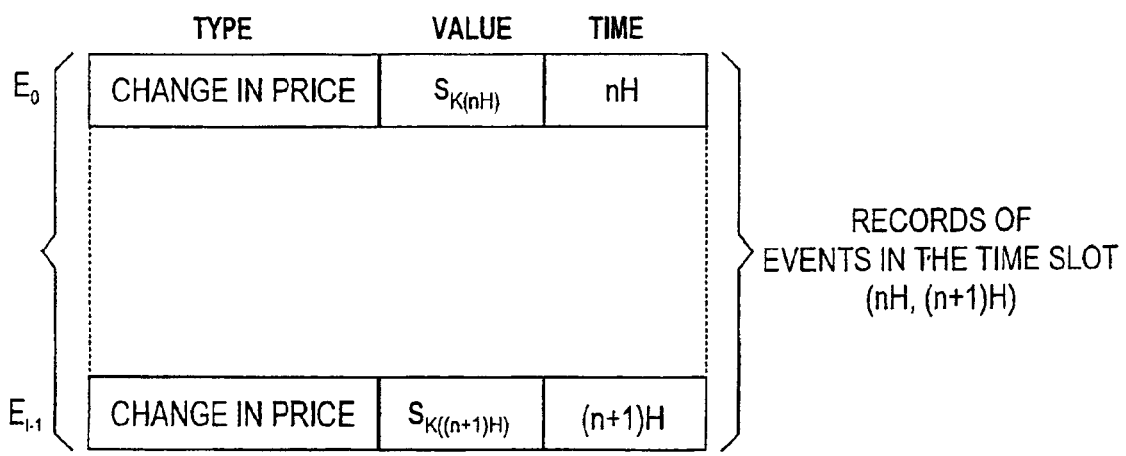
Figure 3:
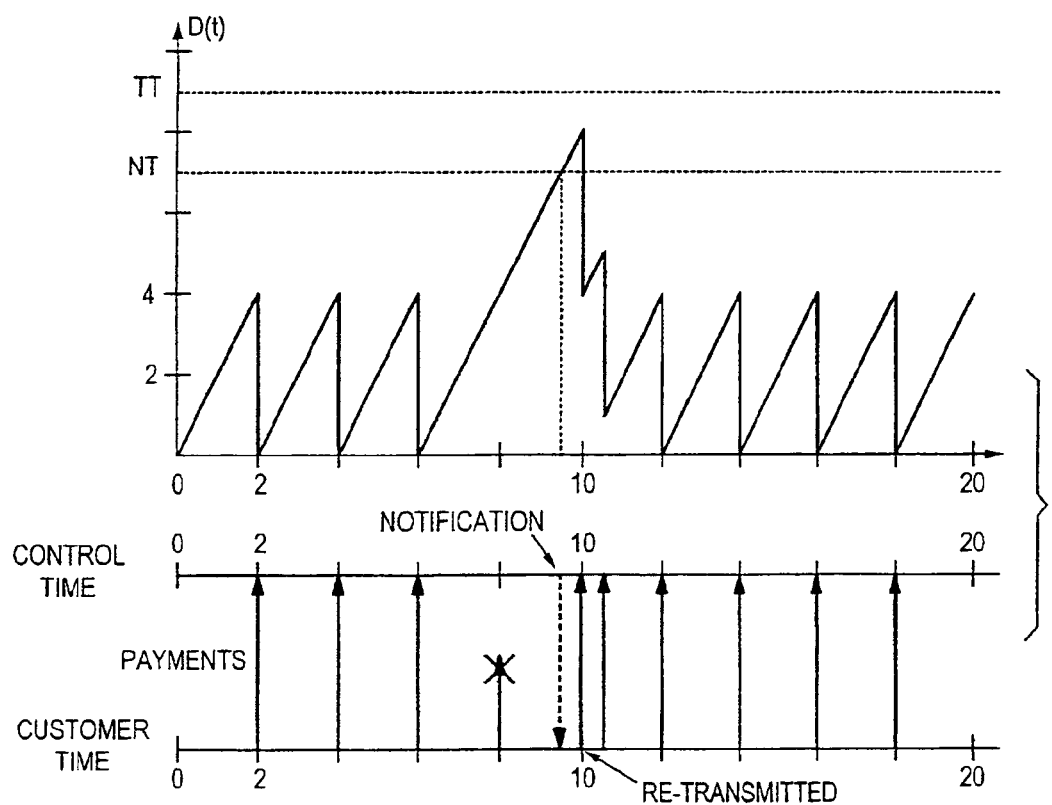
Figure 4:
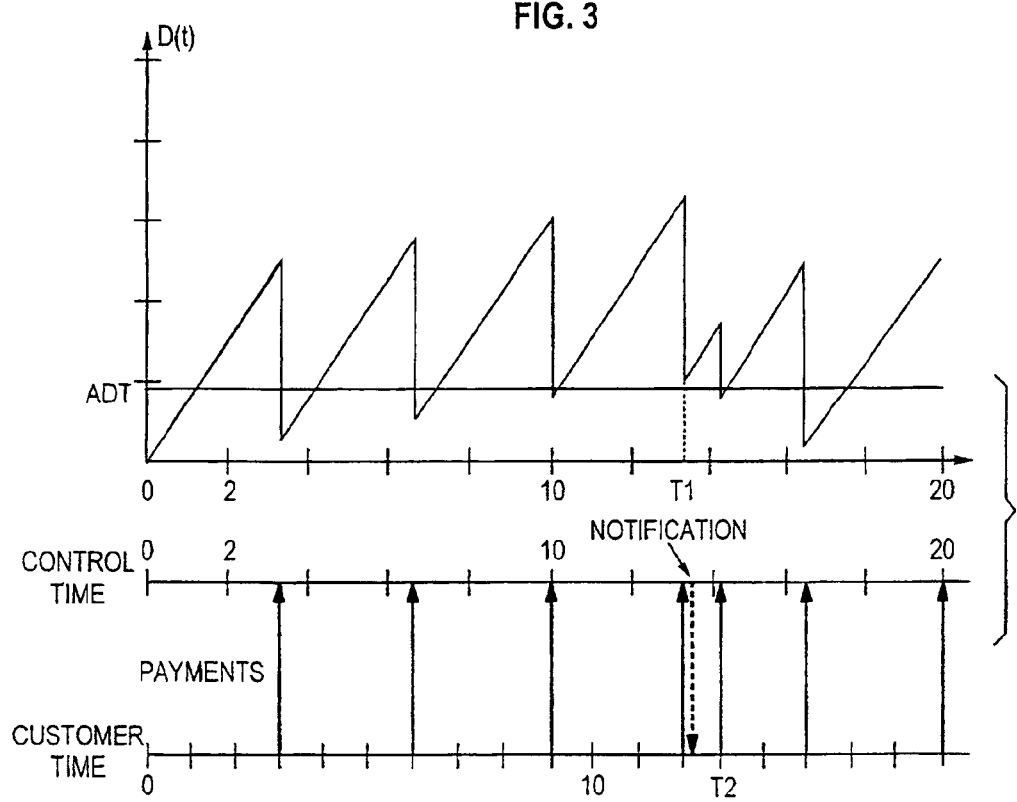
Figure 5A:
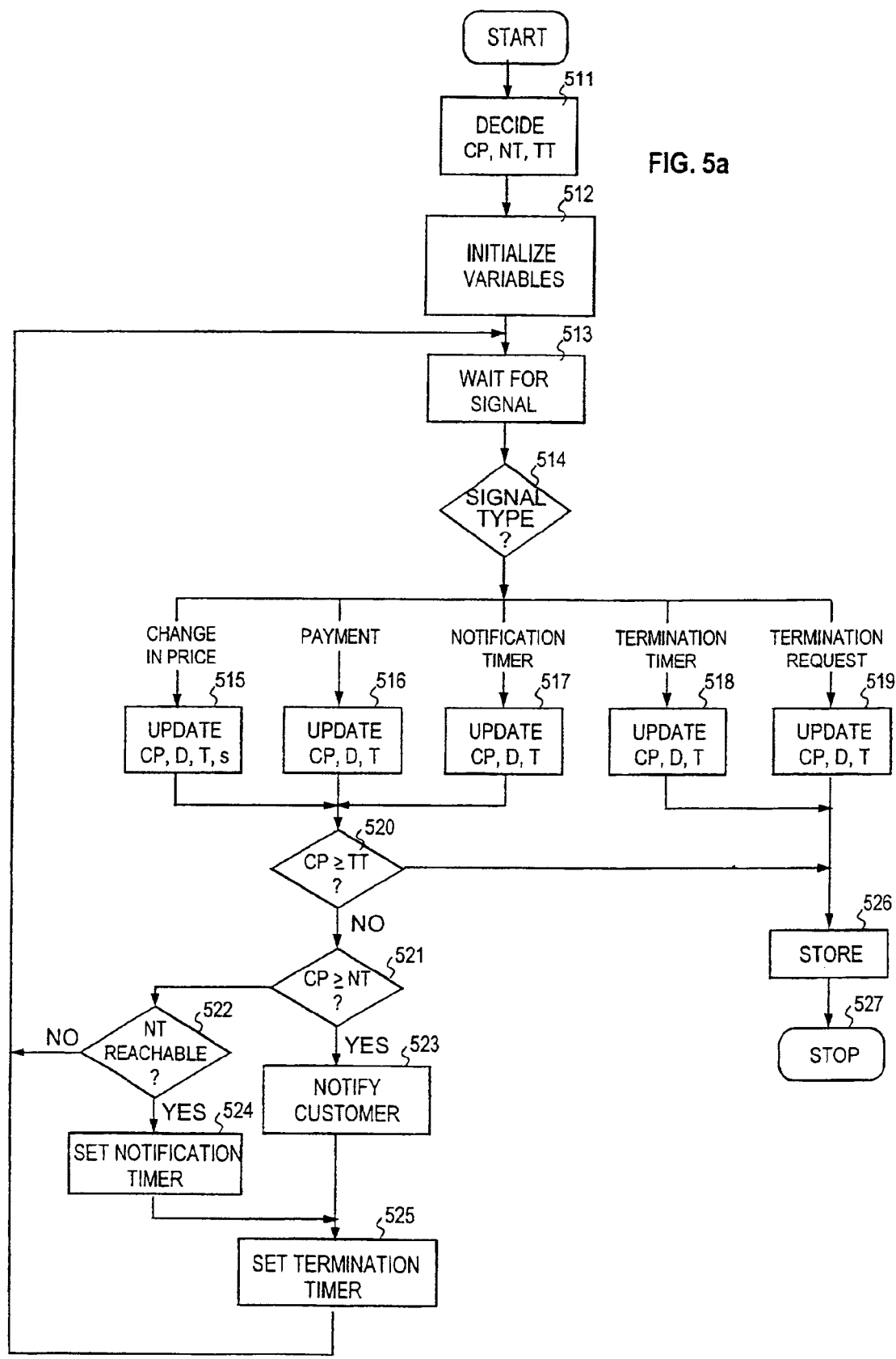
Figure 5B:
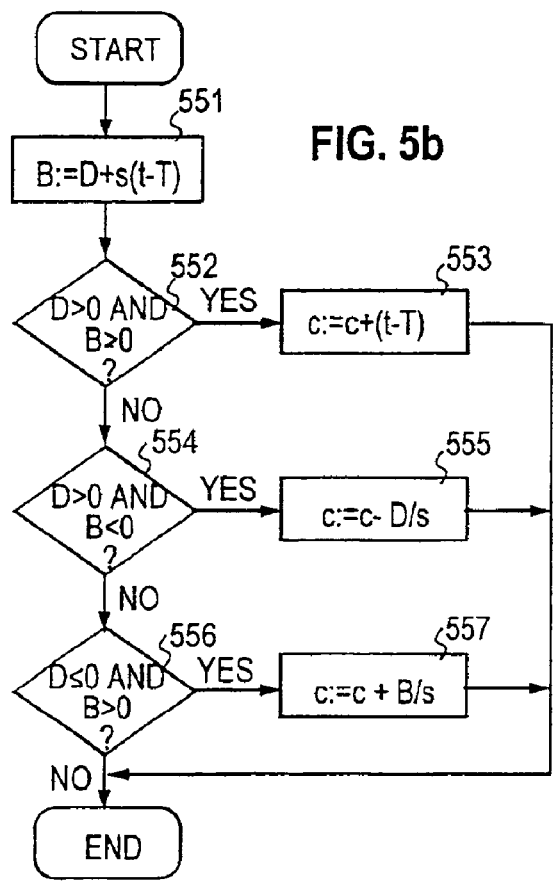
Figure 5C:
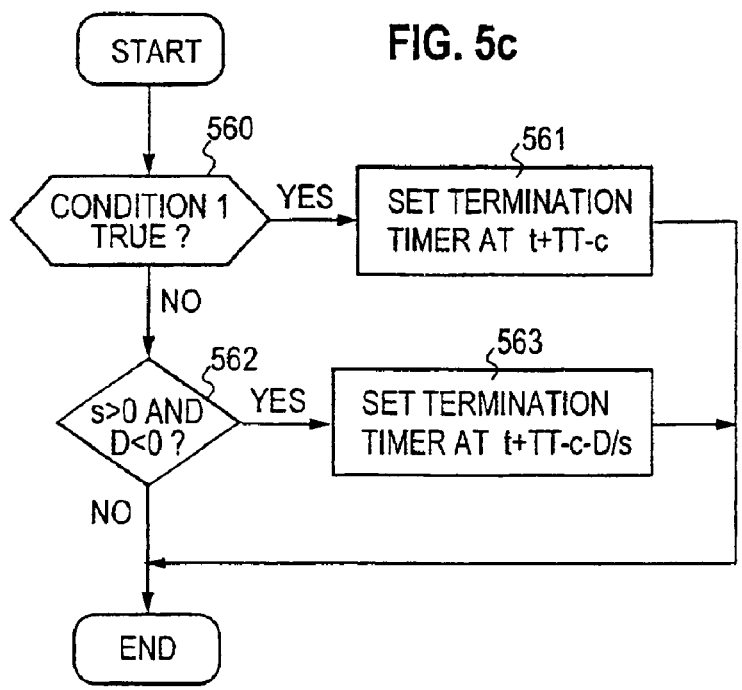
Figure 7:
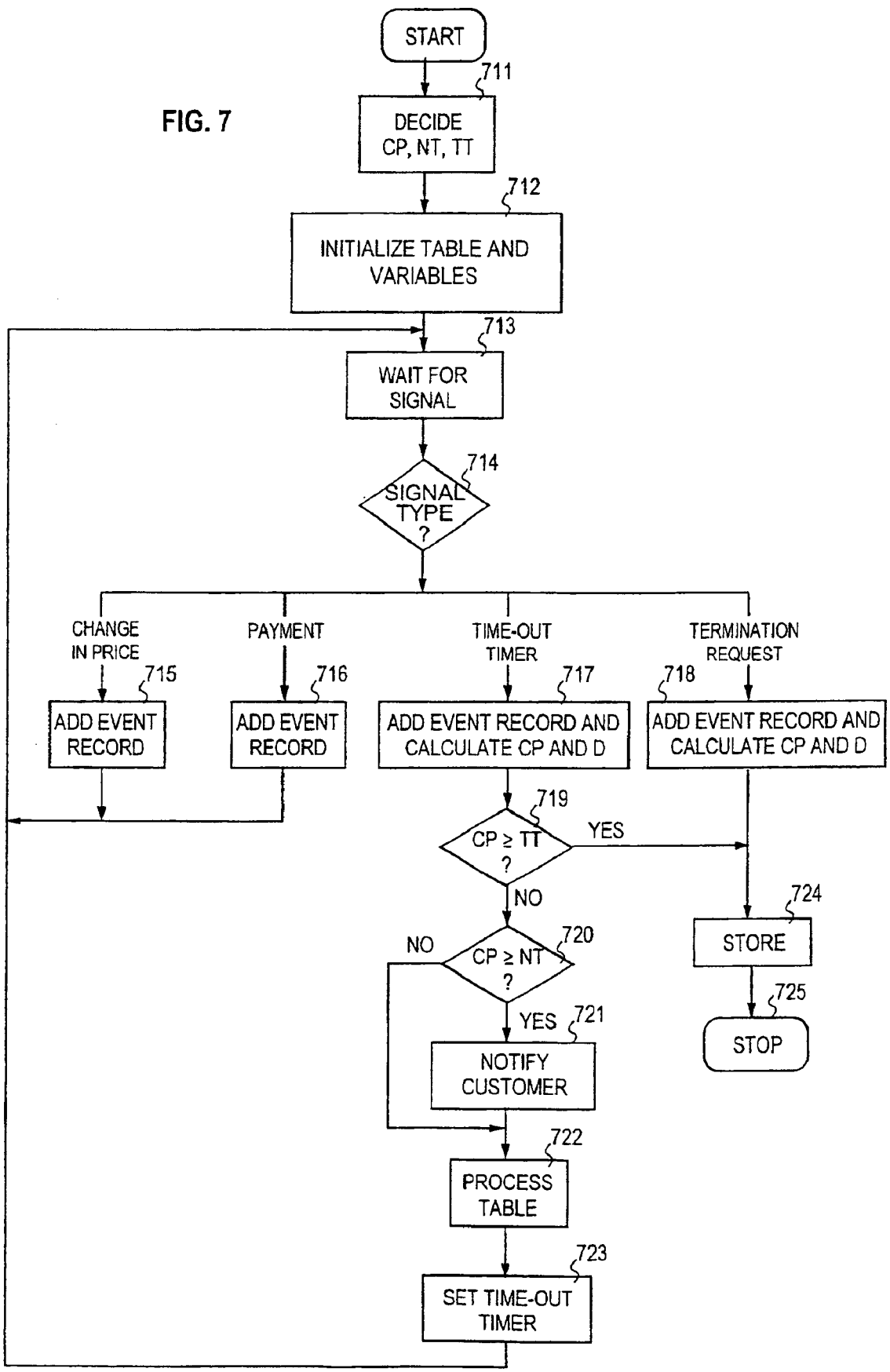
Figure 8:
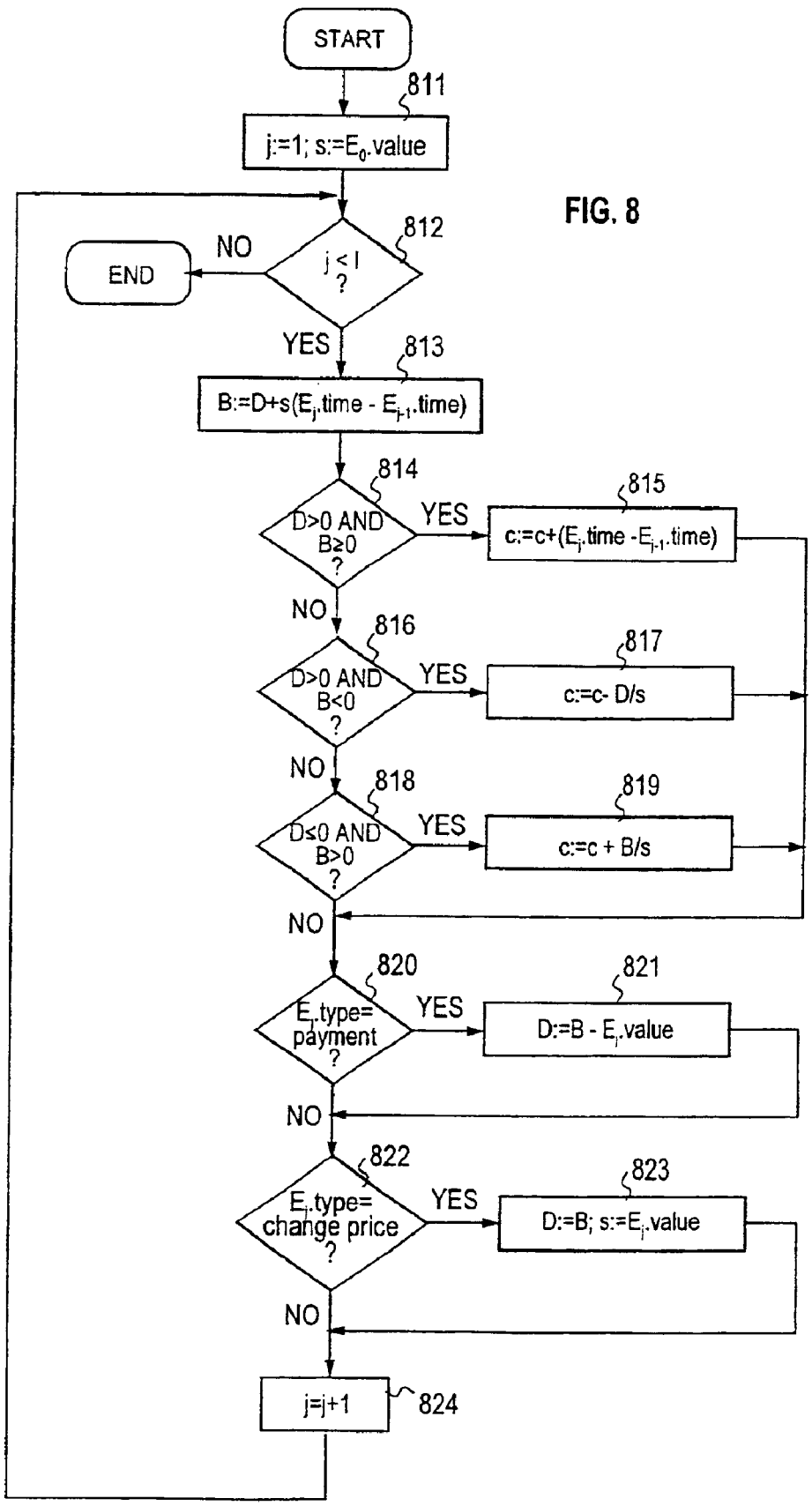
Figure 9:
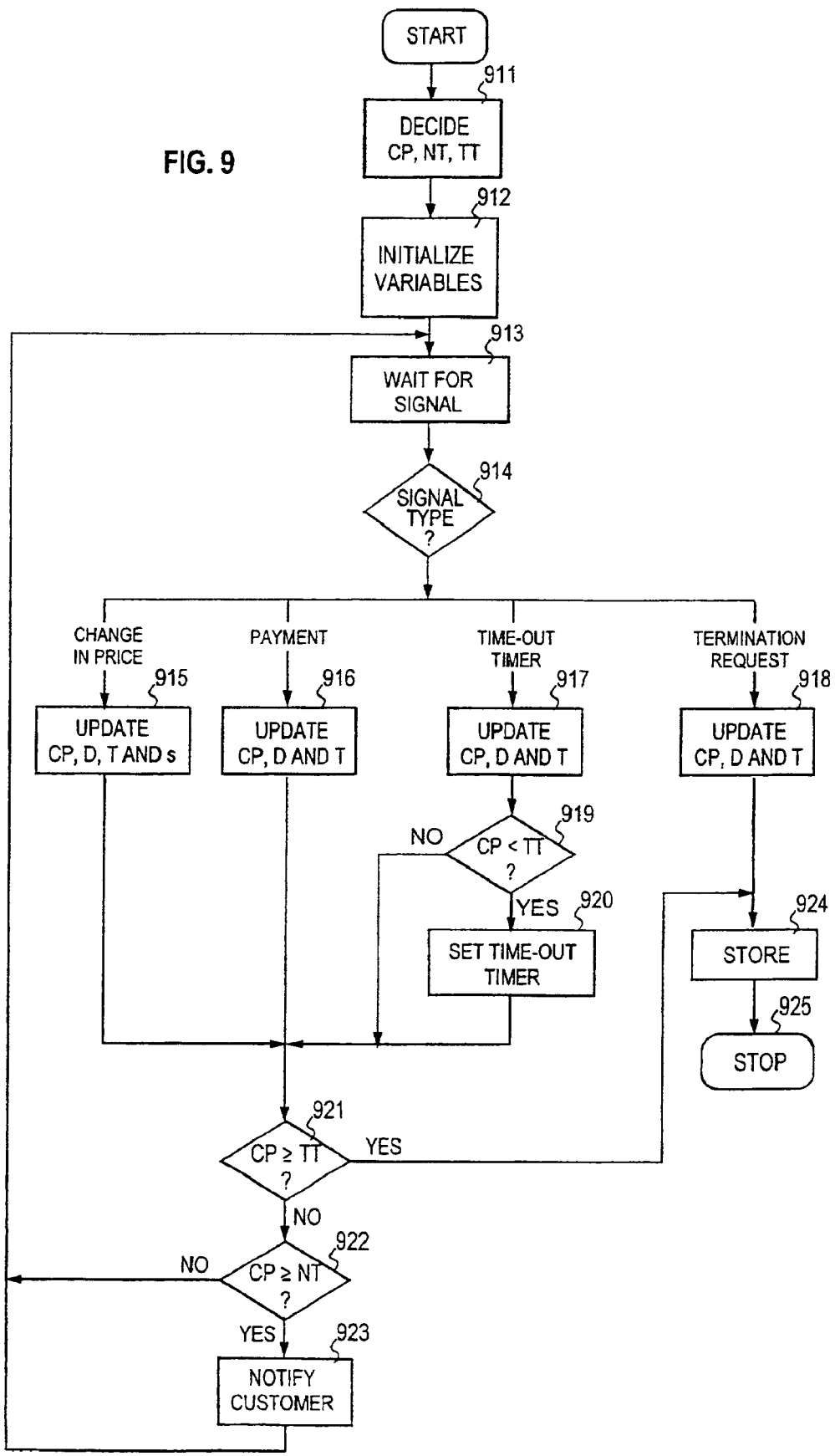
Figure 10A:
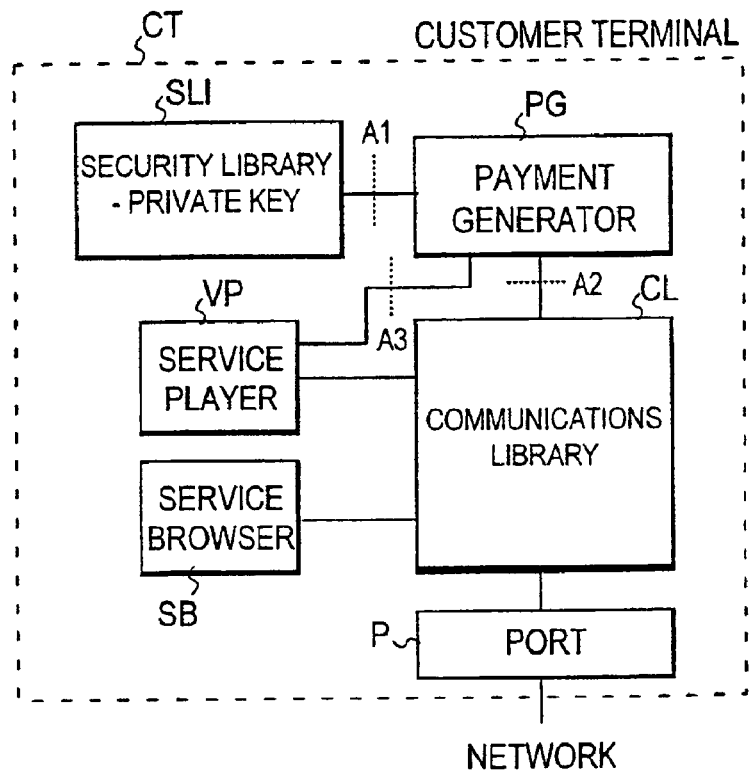
Figure 10B:
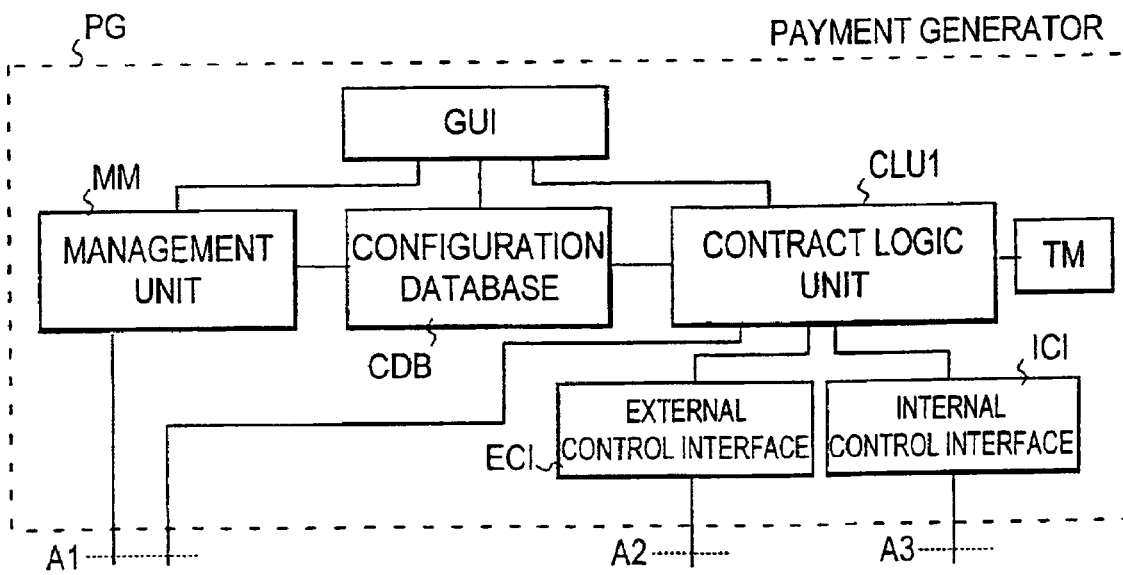
Figure 11:
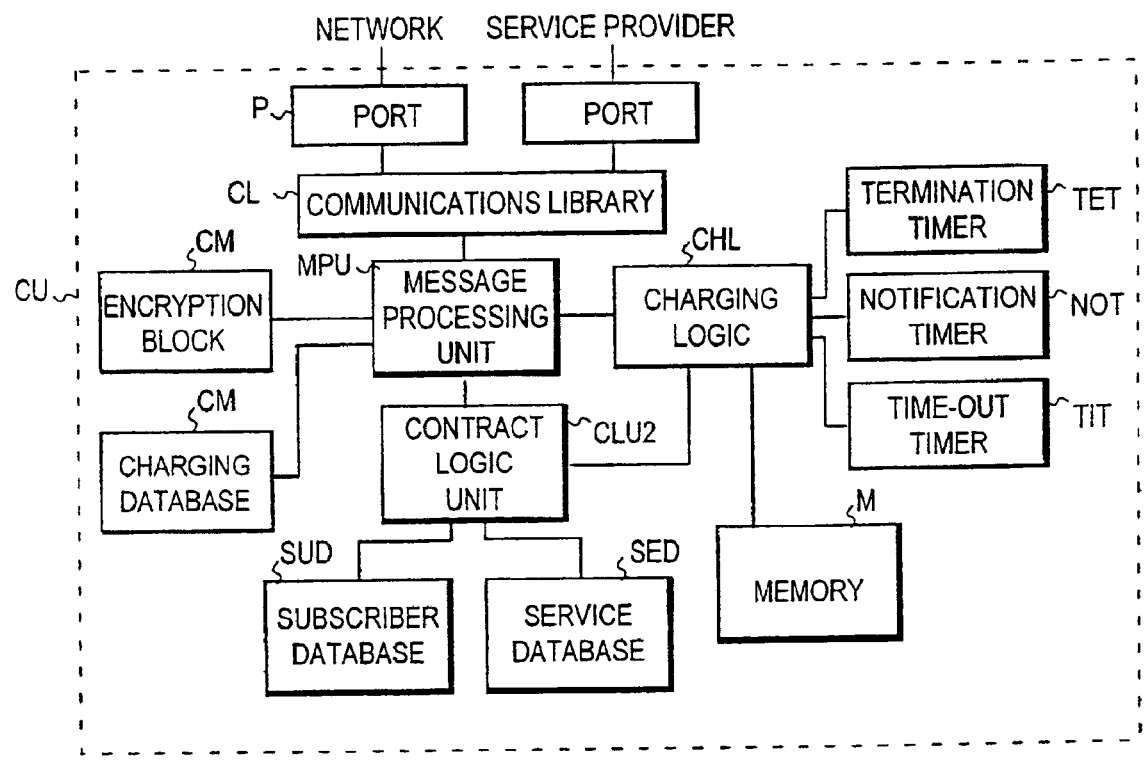
Figure 12:
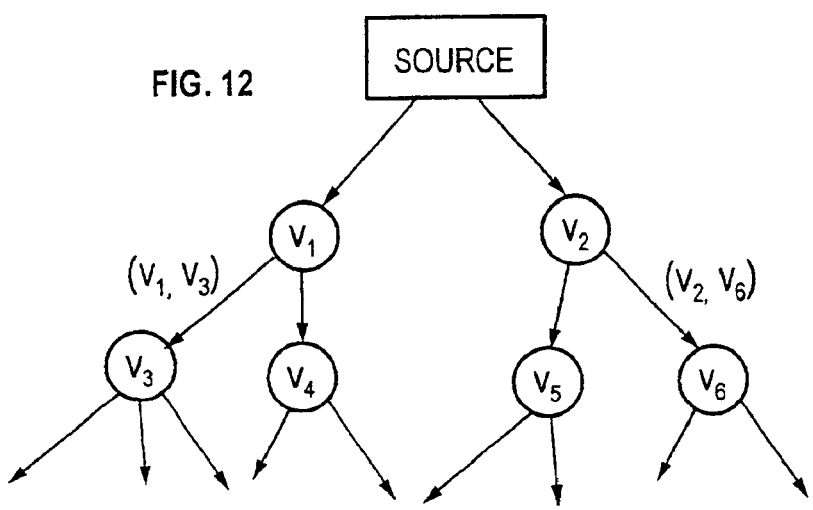

FIG. 3 illustrates the effect of the debt thresholds when a payment is lost somewhere in the network, FIG. 4 illustrates the effect of the debt thresholds when the clock of the customer terminal is slower than the clock of the control process, FIG. 5a is a flow chart illustrating the first embodiment of the control process, FIG. 5b is a flow chart illustrating the update of the control parameter in the embodiment of FIG. 5a, FIG. 5c is a flow chart illustrating how the termination timer is set, FIG. 6 shows a table used in the second embodiment of the control process, FIG. 7 is a flow chart illustrating the second embodiment of the control process, FIG. 8 is a flow chart illustrating the update of the control parameter in the embodiment of FIG. 7, FIG. 9 is a flow chart illustrating the third embodiment of the control process, FIG. 10a shows the structure of the customer terminal in the form of a functional block diagram;

FIG. 10b provides a more detailed description of the structure of the payment generator of the customer terminal;

FIG. 11 shows the structure of the control process unit in the form of a functional block diagram;

FIG. 12 illustrates the delivery of multicast services.

A DETAILED DESCRIPTION OF THE INVENTION

Figure 1:
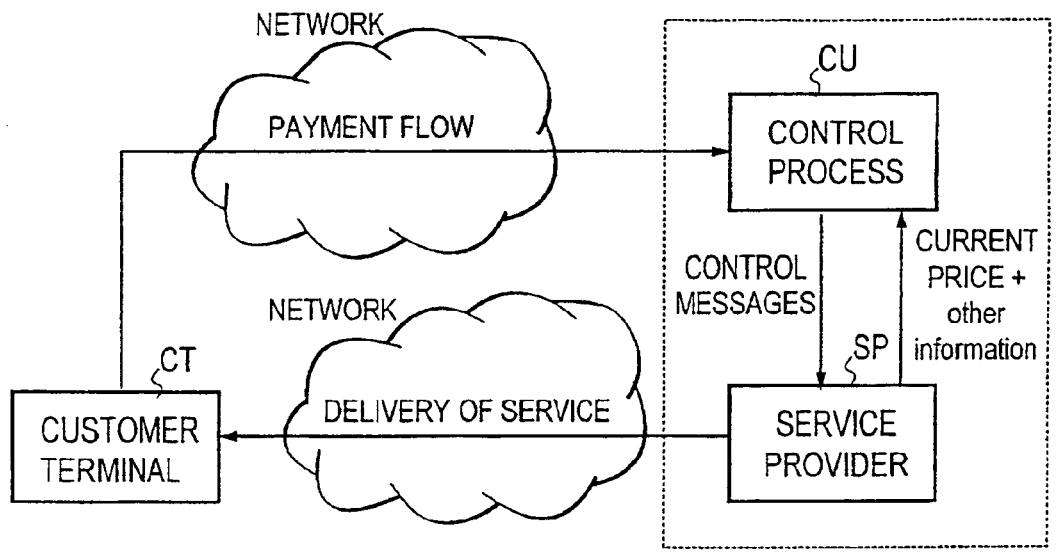
FIG. 1 illustrates a network environment in which the method in accordance with the invention is used on a general level.

FIG. 1 illustrates the operating environment of the present invention on a general level. There are three parties involved in a charging session: the user of the information service, i.e. the customer, the service provider and a control process unit that monitors how the customer pays for the service. The customer has a terminal CT that receives the service form the service provider and sends one or more payment messages to the control process unit CU in return to the service received. The control process unit monitors online these payment messages and, in response to the information received, controls the delivery of the service by sending control messages to the server SP of the service provider. The control process unit also obtains the current prices of the services provided and uses them in assessing the behaviour of the customers during the service sessions.

Each payment message may contain actual electronic money or information on the exact amount of money that the customer is committed to paying. Moreover, an individual payment message may include a payment for the whole service or for only part of the service. In this context we assume, however, that the service is a continuous service that lasts for a certain period of time, typically from several minutes to a few hours. An example of such a service is an audio-visual stream (such as a movie) transmitted to the customer from the server of the service provider. We also assume that the customer pays for the service in small increments, whereby an individual payment message includes a payment for a short period, for example for one minute, which is a much shorter period than the total time that the service lasts. Another example of a continuous service is a (network) game which a customer can play at his or her own terminal.

The delivery of the service starts after the customer and the service provider agree on the price of the service. During the delivery of the service the customer sends payment messages to the control process, and as long as the payments are sent according to the terms agreed, the control process does not interrupt in the delivery of the service.

The control process and the service provider can be collocated in the same information server, or they may reside with separate hosts and even belong to separate organizations. Thus, there may be a network between the server of the service provider and the control process.

The first phase of a charging session is usually the price negotation: the customer requests a certain service, and an agreement is made on the price of the service as well as on the payment scheme.

In the next phase, the service is delivered to the customer. The customer usually sends payment messages to the control process unit concurrently to the service delivery. The delivery of the service continues as long as the customer adheres to the agreed payment scheme or until either the customer or the service provider decide to terminate the service. If the customer fails to send the payments to the control process unit according to the agreed scheme, the control process informs the service provider to stop the service.

As mentioned earlier, the customer terminal preferably generates a flow of payments so that a continuous service is paid in small increments. If the delivery of the service stops, due to a connection failure, for example, the customer's losses then remain small. It is assumed here that the customer (or the customer terminal) can limit his or her own risks by deciding when to send the payments and the sum of money in each payment. The payments can be sent at irregular intervals from the user terminal, and they can contain varying sums of money.

In addition to the details related to money (value, currency, etc.), there must be two identifiers in each payment: the payment flow identifier (which is the same for all payments belonging to a certain charging session) and a unique identifier, e.g. a sequence number, to ensure that none of the payments is accepted more than once. As mentioned earlier, the information in the payment must also be protected against forgery, tampering, or unintentional modification in transfer, for example, by digitally signing the payment messages.

In the negotiation phase it is also possible to define a nominal time interval I according to which the customer is to send the payments. This interval has to be set at a minimum of one order of magnitude larger than the average round-trip time across the network so that the customer has time to send further payments if the control process unit asks for them. A lower limit for the time between payments can also be defined to protect the control process from overload due to a flood of payments. The overload protection may be carried out, for example, by the known leaky bucket mechanism at the payment reception point.

A general environment for charging network services is described in the above-mentioned PCT patent application PCT/FI97/00685 and also in another earlier PCT patent application PCT/FI98/00590 (confidential at the filing of this application) filed by the same applicant. More background information can be found in these documents.

The price of the offered service can be a combination of flat fee charges and charges based on delivery time or delivered data volume V. The number of fixed price components at time t is $M(t)$, and the sum of the fixed price components is $e(t)=e1+e2+\ldots+eM(t)$. The delivery of a service starts at time $t=0$, and the total service charges at time t are:

$$C(t)=e(t)+st+rV(t), \tag{1}$$

where s is the price per time unit and r is the price per volume unit.

In general, the price of a service can be any function of time and data volume, i.e. $C=C(t, V)$. For the sake of simplicity, we will concentrate on time-based and flat-fee charging in the following. Consequently, r is assumed to be zero. However, it is important to note that the methods in accordance with the invention are applicable also to volume-based charging, provided that the customer cannot forge the measurements of traffic volume V. This requirement may be hard to enforce if the customer's terminal is a general purpose computer. However, the requirement can be met if the terminal is an embedded device, such as a mobile phone. An example of how volume-based charging can be added to the system is described in the above-mentioned PCT application PCT/FI98/00590.

As mentioned above, the price of the service per time unit does not have to be constant. We assume that the price changes at times ti so that $s(t)=s_i$, $t_i \leq t < t_{i+1}$. By the time t there have been $K(t)$ changes in price s; the first change occurs at $t=0$, i.e. $K(0)=1$. When $s_i>0$ the customer is charged for the service. Cases $s_i=0$ and $s_i<0$ are relevant as well: during advertisements, for example, the price can be zero or negative. Negative prices can also be of use in network games mentioned above; a customer can win bonuses in the game.

The general formula for the accumulated charges at time t is $$C(t) = \int_0^t s(\tau) d\tau + \sum_{i=1}^{M(t)} e_i.$$

For the sake of simplicity we assume here that the price per time unit of the service can vary in time domain so that it remains piecewise constant. FIG. 2a shows an example of this kind where the price per time unit varies between −2 and +4 monetary units. In the case of a piecewise constant price per time unit the above equation can be rewritten as follows:

$$C(t) = s_{K(t)}(t - t_{K(t)}) + \sum_{i=1}^{K(t)-1} (t_{i+1} - t_i)s_i + \sum_{i=1}^{M(t)} e_i. \quad (2)$$

FIG. 2b illustrates the accumulated charges $C(t)$ when the price varies as in FIG. 2a. As can be seen in the Figure, the price per unit, $s(t)$, defines the slope of the curve $C(t)$. The time instances ti, when the service price changes, can be clearly noticed.

As mentioned above, the customer (or the customer terminal) can decide the amount of payment for each payment message. If we denote the value of money in i:th payment by pi and the number of received payments at time t by $N(t)$, the total sum the customer has paid or made a commitment to pay is $$P(t) = \sum_{i=1}^{N(t)} p_i. \quad (3)$$

Although all the payments need not contain the same amount of money, the service provider may define a nominal interval I at which the payments should be sent. If the customer adheres to this nominal interval and the price s is constant, then the value of money in the payments is $p_i=sI$.

FIG. 2c shows an example of the accumulated sum $P(t)$ formed from payments sent at irregular intervals and containing varying sums of money.

Let us now define the customer's debt at time t, $D(t)$, as the difference between the accumulated costs $C(t)$ and the sum of the received payments $P(t)$, i.e. $D(t)=C(t)-P(t)$. Taking into account equations (2) and (3), this results in $$D(t) = s_{K(t)}(t - t_{K(t)}) + \sum_{i=1}^{K(t)-1} (t_{i+1} - t_i)s_i + \sum_{i=1}^{M(t)} e_i - \sum_{i=1}^{N(t)} p_i. \quad (4)$$

The value of $D(t)$ is larger than zero when the customer has paid less than the service has cost, and $D(t)<0$ when he or she has paid in excess. The customer owes the service provider when $D(t)>0$ and therefore $D(t)$ is called a debt.

FIG. 2d shows the debt as a function of time when the charges accumulate as shown in FIG. 2b and when the customer pays as shown in FIG. 2c.

The values of debt $D(t)$ can be used to characterize whether the service is delivered as a prepaid service or on credit. If $D(t)<0$ during the whole delivery time, the service is prepaid.

If the customer is bound to send payments containing a constant amount of money at nominal time intervals, there are two alternatives for prepaying the service:

The customer pays for each time unit of the service, such as a media stream, in advance. The customer may also have deposited a sum with the service provider.

The customer has deposited a larger sum with the service provider and the payments are retrieved in arreas.

If the debt is larger than zero during some of the delivery time, then the service is at least partially delivered on credit.

According to the invention, a debt-related control parameter CP is determined for the control process. As described below, the value of the control parameter is dependent on all the prices that affect the costs $C(t)$ and also on the way the customer has paid, up to the current time, for the service.

Furthermore, one or more limits for the value of the control parameter, according to which the customer has to send payments, are also defined for the control process. The control process then calculates the current value of the control parameter during the service session and compares the calculated value to the said limits to decide what measures have to be taken, if any. Depending on the embodiment and on the value of the control parameter, the customer can be notified of impending service termination or the service can be terminated at once.

In the simplest embodiment of the invention, the debt incurred by the customer is used as said control parameter, i.e. $CP=D(t)$. In the following we assume that this is the case.

As mentioned above, the value of $D(t)$ is a direct measure of how much the customer owes to the service provider. To minimize the risks for the service provider, it is advisable to have a threshold for the maximum value of the debt. Furthermore, it is preferable to have one or more lower notification thresholds to inform the customer that his or her debt is approaching to the service termination limit. In this way lost payments do not automatically result in termination of service. Thus, according to a preferred embodiment of the invention, at least two threshold values are used for the control parameter: a lower value which is used to decide when the customer is to be notified of impending service termination and a higher value which is used to decide when the service is to be terminated. In the following, the former is called the notification threshold and the latter the termination threshold.

When the value of $D(t)$ exceeds the predefined notification threshold, the customer is asked to send a new payment. If the debt increases further so that it reaches the termination threshold, delivery of the service is terminated.

FIG. 3 illustrates the effect of the said thresholds (when debt as such is used as a control parameter). In the figure, the termination threshold, which defines the maximum amount of unpaid service that the customer can receive, has been denoted with TT, whereas the notification threshold has been denoted with NT. As long as the payments are received at regular intervals, the upper bound of the debt is sI=4. When a payment is lost, D(t) increases above this value and reaches the notification value NT=7. After receiving notification from the control process unit (or from the service provider), the customer terminal re-sends the lost payment, whereby D(t) does not reach the termination threshold TT=9. After receipt of the re-sent payment, the debt is D(t)≦4.

In order that the customer is able to react to the notification before the termination threshold is reached, the difference TT−NT has to be clearly greater than SΔ, where S is the highest service price during the charging session, or an estimate thereof, and Δ is the average round trip time between the service provider and the customer terminal.

Let us now denote the arrival times of the payments with ai and further, let $^{t=a_i-}$ and $^{t=a_i+}$, respectively, be the time just before and after the payment pi has been received. In certain situations the value of debt just after a payment has been received may be very useful for carrying out the control. This value is denoted with $^{D(a_i+)}$ in the following.

Consequently, according to one preferred embodiment of the invention, there is also a separate threshold ADT for the value of debt just after the payment. If $^{D(a_i+)}$>ADT, the customer is notified of this. The value of this threshold is ADT<NT<TT. It is also possible to define a termination threshold for $^{D(a_i+)}$ to prevent the customer from maintaining the value of D(t) near the termination threshold.

If the customer's clock is slower than the reference clock of the control process, the value of $^{D(a_i+)}$ increases gradually. With the notification, the customer can take this into account, for example, by sending an extra payment after receiving the said notification. This kind of situation is illustrated in FIG. 4, which shows an exemplary case where the customer's clock is 10% slower than the reference clock. At t=T1 the after-payment-debt reaches the corresponding threshold. At time t=T2 the customer sends a small extra payment. Note that the debt after payment $^{D(a_i+)}$ may also exceed threshold ADT when there are payments missing. If one wants to eliminate notification to the customer in a case where the increase in $^{D(a_i+)}$ is not necessarily due to drifting clocks, some extra logic taking into account the missing payments has to be introduced into the control process unit.

According to a further preferred embodiment of the invention, the accumulated amount of time during which the customer has been in debt is used as the control parameter. In other words, the control process limits the amount of time during which D(t)>0. If x(t) is defined by $$x(t) = \begin{cases} 1 & D(t) > 0 \\ 0 & \text{otherwise,} \end{cases} \quad (5)$$

then the amount of time within the period (0,t) during which D(t)>0 is $$c(t) = \int_0^t x(\tau) d\tau, \quad (6)$$

where c(t) is a non-decreasing function whose value is at most t. The customer has no way of decreasing c(t); he can only prevent it from growing.

Again, a termination threshold TT is set for the value of c(t). Note that if the termination threshold TT=0, then the debt-time limited delivery of service is prepaid. A notification threshold between zero and TT can also be defined. Note that even though the same reference marks (TT and NT) are used for the thresholds of different control parameters, the values and units of the thresholds will vary depending on the control parameter in question.

In the following the implementations of the control processes are described in more detail. For the sake of brevity, we omit the validation of N(t) and the book-keeping of the sequence numbers from the following description. To detect missing or duplicate payments the control process has to remember the number of the lastly received payment, N(t), and to keep track of the gaps in the sequence 1, 2, . . . , N(t). Furthermore, as the treatments of fixed costs and payments are identical, except for the fact that a fixed cost eM(t) adds to D(t) and a payment subtracts from D(t), the fixed costs ei have also been omitted in the following description.

The above-described control processes can be implemented in at least three different ways. According to the first implementation, the moments in time at which the control parameter will exceed the thresholds are estimated. Two timers are used in this example: a notification timer which expires when the value of the control parameter is estimated to reach the notification threshold and a termination timer which expires when the value of the control parameter is estimated to reach the termination threshold. According to the second implementation, the value of the control parameter is calculated periodically. In this second implementation the control parameter may exceed the threshold somewhere between two consecutive check points and this is noticed when the value is next checked. In the third embodiment, the value is calculated periodically and also whenever a payment is received or the price of the service changes.

FIG. 5a is a flow chart illustrating a control process that works according to the first implementation, in which the moments in time are estimated at which the control parameter will exceed the thresholds. At the beginning the control process decides the control parameter CP that is to be used in the control process, as well as the values of the thresholds NT and TT associated with this control parameter (phase 511). After this the process initializes to their initial values (phase 512) the variables T (time), D (debt), CP, and s. At this stage the variable T gets the value of the current time and the other variables get their initial values. The initial values can be fixed values or customer-specific, and they can be set according to the earlier service sessions of the same customer.

After initialization the actual control process (charging session) starts when the control process unit enters a wait state (phase 513), whereby it waits for certain signals to arrive. There are five different signal types that can be received during this wait state: the first signal indicates a change in the price of the service (i.e. in the value of s), the second signal indicates that a payment has been received from the customer, the third signal indicates that the notification timer has expired, the fourth signal indicates that the termination timer has expired, and the fifth signal indicates that a termination request has been received. A termination request is received if the customer or the service provider decides, independently of the control process, to stop the service. (Note that the short term "price" is used when the price per time unit is referred to.)

After any of the five signals have been received, the parameters CP, D, and T are updated to their new values (phases 515 . . . 519). After said first, third, fourth and fifth signals the new value of the debt is D:=D+s(t−T), i.e. the previous value added to the value of s(t−T). If the second signal is received, the debt is updated to the value D:=D+s(t−T)−pN(t), i.e. the received payment is taken into account. Further, after receiving the first signal the service price s is updated to its new value (i.e. s:=sK(t)). An example of the update of the control parameters shown below.

If the signal received was either an indication that the termination timer has expired or a termination request, then the updated values are stored for future use and the service is stopped (phases 526 and 527).

On the other hand, if the signal received is the first, second or third signal, then the updated value of the control parameter is compared to the termination threshold TT (phase 520). If the comparison shows that the value of the control parameter is equal to or larger than the value of the termination threshold, the variables are stored and the service is stopped (phases 526 and 527).

However, if this is not the case, i.e. if the value of the control parameter CP is less than the termination threshold, the new value of the control parameter is compared to the value of the notification threshold NT (phase 521). If the value of the control parameter proves to be equal to or greater than the notification threshold NT, then the customer is notified (phase 523) by means of the above-mentioned notification message sent to the customer terminal, and the termination timer is set (phase 525). If the debt is used as the control parameter, the current time is t and s>0, then the time of termination will be t+(TT−D(t))/s.

If the value of the control parameter has not yet reached the value of the notification threshold NT, then it is checked whether the conditions are such that the notification threshold can be reached without a change in the value of s (phase 522). If this is the case, then the notification timer is set (phase 524). If the debt is used as the control parameter, the time of notification will be t+(NT−D(t))/s.

In phase 522 a check is made as to whether it is of any use to set the timers. For example if s≦0, there is no point in setting the timers because D(t) is not increasing.

After this the process returns to the wait state (phase 513) to wait for a new signal.

As obvious, it is possible to send a notification to the customer and/or to the service provider also when the service is about to be stopped (i.e. connection with phases 526 and 527).

FIG. 5b is a flow chart illustrating how the control parameter is updated in the process of FIG. 5a, i.e. how the control parameter update is performed in phases 515 to 519. In this example, it is assumed that the time-in-debt is used as the control parameter, i.e. CP=c(t). First, a temporary variable B is given the value D+s(t−T) in phase 551, i.e. B represents the new value of the debt. Then, the new value of the control parameter must be calculated in one of three alternative ways, depending on the previous and new values of the debt. If the previous value is positive and the new value is equal to or greater than zero, the control parameter is updated to the value c+(t−T) in phase 553. If the previous value is found to be positive and the new value negative, the control parameter is updated to the value c−D/s in phase 555. If the previous value is found to be at most zero and the new value greater than zero, the control parameter is updated to the value c+B/s in phase 557.

FIG. 5c illustrates how the termination timer is set if c(t) is used as the control parameter. It can be shown that in this case, if the control parameter will reach the termination threshold, it will do it either after time TT−c or after time TT−c−D/s, where c, D, and s correspond to the values obtained in the latest update of said variables in phases 515 and 516. It can also be shown that the first case is applicable when [(s≧0∧D≧0)∧¬(s=0∧D=0)]∨[s<0∧D≧(c−TT)s], where ∧ is the logical AND operation, ∨ the logical OR operation, and ¬ the logical NOT operation. This is the condition 1 tested in phase 560 of the Figure. The second case is applicable when s>0 and D<0. This is tested in phase 562.

In the above-mentioned second implementation, the value of the control parameter is checked periodically by utilizing a time-out timer which expires when the check must be performed. This periodic computation of the control parameter value is based on recorded events indicating a payment or a change in price, i.e. each time a payment arrives or the price changes, the corresponding event is recorded in a table. A record of an event Ei contains a triplet (type, value, time), where the type is either "payment" or "change in price". In between the checks the control process stores those records in a table (i.e. event records are stored when said events occur). The information on the table is then used at the next check point of the control parameter.

Table E is shown in FIG. 6. The length of the table is denoted by l. Thus, the table is an array of l records. Every H unit of time, for example, every 20 seconds, the control process computes the new values of the control parameter and the debt and then prepares the table. The first and the last records of the table are both of the type "change in price". The first record, E0, is initialized to ("change in price", sK(nH), nH) at the end of each computation of the control parameter. The last record, El-1, is ("change in price", sK(nH), (n+1)H); the control process adds that record to the end of the table before a new computation of the control parameter starts. Thus, in absence of external events in a period (nH, (n+1)H), at the end of that period when t=(n+1)H, the table E will contain two records.

At the beginning of the charging session the control process initializes E0 to ("change price", s1, 0) and l to 1; in addition it schedules the first time-out signal to arrive at t=H.

FIG. 7 is a flow chart illustrating the periodic computation of the value of the control parameter. The first two phases (711 and 712) are in this case similar to the embodiment of FIG. 5a, except that in phase 712 the table is also initialized in the above-described manner.

In this embodiment the control process can receive four different types of signals in the wait state (phase 713): the first signal indicating a change in the price of the service (i.e. in the value of s), the second signal indicating that a payment has been received from the customer, the third signal indicating that the time-out timer has expired, and the fourth signal indicating a termination request. The time-out timer expires at the above-mentioned check points.

After any of the four signals have been received, table E is updated in the above-described manner (phases 715 . . . 718) by adding the event record to the table. Further, if the said third or fourth signal is received, parameters CP and D are also updated to their new values. As mentioned above, in connection with the third and fourth signal the added record is "change in price".

After the table update in connection with the first and second signals (i.e. after phases 715 and 716), the process moves to the wait state (713) to wait for a new signal, whereas after the table update associated with the fourth signal the variables are stored and the service is stopped (the termination request is received).

Only after the said third signal does the process continue by comparing the new value of the control parameter to the termination threshold (phase 719). If it is then noticed that the value of the control parameter is equal to or bigger that the value of the termination threshold, the variables are stored and the service is stopped (phases 724 and 725).

If this is not the case, i.e. if the value of the control parameter CP is smaller than the termination threshold, then the new value of the control parameter is compared to the value of the notification threshold NT (phase 720). If the value of the control parameter is found to be equal to or greater than the notification threshold NT, then the customer is notified (phase 721) and the table is processed (phase 722) so that only the above-mentioned last record remains in the table. If the control parameter is smaller than the notification threshold, the notification phase is skipped and the control process jumps directly to phase 722 to process the table. After the table has been processed, the time-out timer is set (phase 723). After this the control process moves back to the wait state to wait for a new signal.

FIG. 8 is a flow chart illustrating how the control parameter is updated in the process of FIG. 7, i.e. how the control parameter update is performed in phases 717 and 718. In this example, it is again assumed that the time in debt is used as the control parameter, i.e. CP=c(t). In the figure the reference mark Ei.type refers to the value of the type field of the i:th record in the table. First, the process gives value 1 to the table index j and sets the value of the price s as equal to the value of the value field of the first record of the table (phase 811). After this, the process tests whether the current record is the last record of the table (phase 812). If this is the case, the process is stopped. Otherwise, the process jumps to phase 813 where a temporary variable B representing the new debt value is given the value D+s(Ej.time−Ej−1.time), i.e. the value of the time field of the previous record is subtracted from that of the current record, the difference is multiplied by the price s, and the result is added to the previous value of the debt. After this, the control parameter value is updated in 814 to 819 similarly as shown above in connection with FIG. 5b, i.e. the calculation rule depends on whether the previous and current values of debt are positive or negative.

After the new value of the control parameter has been calculated, the process tests whether the type field of the current record is "payment". If this is the case, i.e. if the message received contained a payment, the amount of the payment is taken into account in the current value of debt (phase 821). After this, and if the type field of the current record was not "payment", the process tests whether the type field of the current record is "change in price" (phase 822). If so, the debt is given the current value of the variable B and the price is updated to its new value (phase 823). After this, and if the type field of the current record was not "change in price", the process increments the value of the table index j by one and jumps back to phase 812 to test whether the end of the table has been reached.

In the above-mentioned third embodiment the control process computes the control parameter not only when a period of H time units expires but also when it receives an external signal (indicating either a payment or a change in the price. When this method is used, the events between the evaluations do not have to be recorded. This method is described next.

FIG. 9 is a flow chart illustrating this kind of embodiment in which the process checks periodically whether the thresholds have been exceeded. In this case the process can receive the same four types of signals in the wait state (phase 913) as in the embodiment of FIG. 7. The update phases (915 to 918) are similar to those of the embodiment of FIG. 5a, in the sense that the table is not needed. If a time-out signal is received in the wait state, the updated value of the control parameter is compared to the termination threshold. If the value is smaller than the said threshold, the time-out timer is set again (phase 920). After this and after the update phases (915 and 916) associated with the first and second signals, the new value of the control parameter is compared to the termination and notification thresholds (phases 921 and 922) and the termination of the service, the sending of the notification, and the jump back to the wait state are performed as depicted above.

With the above periodic computation of the control parameter the maximum amount of unpaid usage that the customer may accumulate is TT+SH, where S is the highest price during the charging session.

In order to get the service stopped even if no messages are received from the customer, the timers can be initialized in phases 512, 712 and 912. Another alternative is that a signal indicating a payment or a change in price is always sent at the beginning of the service session (at t=0). The payment can be a zero payment.

As mentioned earlier, in all the above embodiments the control process can also send a notification after a payment, if CT≧ADT. For simplicity, this is not shown in the flow charts.

The embodiment utilizing periodic computation or the control parameter is less precise than the predictive one (i.e. the one according to FIG. 5a): it may take H units of time for the control process to notice that CP>TT. The periodic computation is, however, a worthwhile technique: when the values of CP are computed periodically, the customer can be charged not only based on the elapsed time, but also based on the volume of data that he receives within each period.

The exactness of the predictive strategy is based on the assumption that the control process is scheduled to run immediately after a signal has arrived. However, for most operating systems this assumption is not realistic, especially if many control processes share the same hardware. If the machine on which the control process runs is such that it is expensive to set and reset timers in terms of CPU load, the second and the third implementations may be preferable to the first one because they utilize a timer which is not affected by external traffic. Another advantage of the second implementation is that all the computations concerning the control parameter are done at predefined moments of time, and thus the maximum load that the computation of the control parameter may cause is predictable.

As is obvious from the above, the control parameter CT characterizes the customer's behaviour during the service delivery. It can be stated generally that the control parameter is dependent (1) on the values of the service price, as well as on the moments of change in the service price, and (2) on the payments made and the moments in time that the payments are made. In other words CT=f({si}, {ti}, {pj}, {aj}), where {} refers to a sequence of values. The control parameter can be a function of D(t), a function of c(t) or a function of both. Using different kinds of control parameters, a control policy most suitable for the service can be developed. In the following, several examples of possible policies are given in which both D(t) and c(t) are used as control parameters.

In addition to setting a threshold on the value of the customer's debt D(t), the service time can be divided into consecutive slots, the length of one time slot being nI: (0, nI], (nI, 2nI], . . . In the first example, the policy requires that within each time slot the amount of time in which D(t)>0 is less than a threshold U. In this way it is possible to limit, in addition to the maximum value of the debt, the rate by which the customer can increase his or her debt.

As another example of a possible policy, the service can be delivered on credit as long as D(t)<A (A>0). If at time t=τ the debt reaches the limit (i.e. $D(\tau)=A$), the customer will be notified that from now on the delivery should be mostly prepaid; the service delivery will be stopped if $c(t)-c(\tau) \geq U$. Thus, if the debt limit is reached, the service is allowed to continue only if part of the charges are paid in advance. With this control strategy, the maximum amount of unpaid usage that a customer may accumulate is A+US, where S is the highest price per a unit of time.

The service may also be delivered on credit, with the (debt-related) termination threshold being TT, as long as $c(t)<U$. If at time $t=\tau$, the time-in-debt threshold is reached and $c(\tau)=U$, then the (debt-related) termination threshold is lowered to TT'<TT. Thus, the maximum debt allowed is lowered if the customer does not pay enough in advance.

In some cases it might be reasonable to require that the customer may be in debt for only a certain proportion of the service delivery time, for example, for a maximum of half of the service delivery time. We may define q(t) as the proportion of time within (0, t) in which $D(t)>0$:

$$q(t)=c(t)/t$$

The ratio of the duration in which the customer has a debt to the duration during which he or she does not have a debt is $$c(t)/(t-c(t))=q(t)/(1-q(t))$$

The quantity $q(t)/(1-q(t))$ can also be used as a control parameter during the service session.

The introduction of more than one control parameters into the process is straightforward. All the control parameters can be calculated in the same phase and then each control parameter is compared to the thresholds corresponding to it.

The control process can also be modified so that a non-zero threshold is used for D(t) in the definition of c(t). To do this, we redefine the equation (5) as follows:

$$x(t) = \begin{cases} 1 & D(t) > A \\ 0 & \text{otherwise,} \end{cases} \quad (7)$$

where A has the units of money. If we denote by cA(t) the amount of time within (0, t) during which $D(t)>A$, we obtain $$c_A(t) = \int_0^t x_A(\tau) d\tau.$$

If A>0, then a service that is controlled by $c_A(t)<TT$ is on credit. It is also to be noted that if A<B, then $c_A(t) \geq c_B(t)$, and the difference $c_A(t)-c_B(t)$ is the amount of time within (0, t) in which $A<D(t)<B$.

To generalize further. let threshold A be a piecewise linear function of time. Then, putting D(t)-A(t) instead of D(t) in equation (5) reduces the computation of cA(t) to that of c(t).

The thresholds can also vary from session to session. They can depend, for example, on the price of the service, on the customer's behaviour during the previous service sessions, and on the length of the current session. The control system can collect data on the behaviour of the customer and, based on the collected data, change the conditions, for example, the thresholds or the price of the service. If the customer meets payments on time, he or she has proved trustworthy and can be given more favourable terms. On the other hand, if the system notes that the customer does not meet the payments on time, more stringent terms can be adopted for that customer. For example, the price can be increased if the time in debt exceeds a certain threshold level. As is obvious from the above, the service provider can dictate the terms of the service or leave this task to a third-party control entity.

FIG. 10a illustrates an example of the structure of the customer terminal CT by means of a functional block diagram. As far as the present invention is concerned, the important part of the customer terminal is the payment generator PG that generates the payment messages. Connected to the payment generator is the security library SLI, whose memory contains the customer's private encryption key and which executes the signing of the payment messages. The payment generator creates the payment messages and transmits them to the security library where they are signed using the customer's private encryption key. The security library returns the signed messages to the generator, which forwards them to the control process unit.

If the application or the environment is such that encrypted messages must be exchanged between the terminal and the charging server, the security library executes the encryption, signing, and signature verification.

The security library can be hardware-based or software-based. However, the hardware-based solution offers better security. Thus, the security library, or part of it, can be construed as described above using a smart card that contains, for example, the private encryption key of the customer.

Additionally, the terminal contains elements for receiving the service. These can include, for example, a service player VP, which can be a video player reproducing the video signal received from the network and may also give the payment generator commands to generate payment messages. The service browser SB, the service player VP, and the payment generator are connected to the network via the terminal's communications library CL. The CL puts together the protocol stack according to which the terminal operates. This protocol stack may, for example, consist of a known TCP/IP stack.

In addition, the terminal can include various components, for example, for monitoring the quality of service (QoS) of the information flow received. For example, a video player can give the source the command to stop transmitting information when the quality of service falls below a certain level.

FIG. 10b shows the functional block diagram of the payment generator PG in greater detail. The contract logic unit CLU1 handles the generation of payment messages based on the information stored in the configuration database CDB. It contains the logic that transfers the received contract information to the graphical user interface GUI and generates the type of charging records described above. This logic includes timing components TM that define the time elapsed between two consecutive payments. The contract logic unit CLU1 is connected to the communications library and the network via an external control interface ECI, and to the service player via an internal control interface ICI. The external control interface carries out the conversion between the internal and external payment message formats. The internal control interface handles message transfer between the service player and the contract logic unit and performs the necessary conversions between the message format used by the service player and the internal message format of the equipment. The connection between the internal control interface and the service player (interface A3) can, for example, be realised using a communications library (TCP socket). The configuration database CDB is used for storing the settings made by the user (user preferences), and it can also be used for storing information on various services (such as films) displayed to the customer in response to the service identification received. This database can, for example, be created with Microsoft Access or Borland Paradox. The configuration database is controlled via the management unit MM. The management unit, the configuration database, and the contract logic unit are all connected to the graphical user interface (GUI) of the device, which can, for example, be implemented using Java applets or the Microsoft Visual Basic programming tool. Part of the configuration database can be located in the network.

If the service player is designed, for example, for audio-visual streams, it can, for example, be implemented using a personal computer and a program designed for such services.

FIG. 11 illustrates an example of the structure of the control process unit CU by means of a general block diagram. As far as the present invention is concerned, the main part of the device is the charging logic CHL, which performs the functions described in the above flow charts. For this, the charging logic uses memory M, in which the above-mentioned parameters and variables are stored. The charging logic also sets the different timers (TET, NOT, TIT) possibly used in the control process.

The incoming and outgoing messages are processed by the message processing unit MPU, which also stores in the charging database CM the payment messages and price changes. The message processing unit is connected to the network through the communications library CL that forms the protocol stack defining the connection to be set up. The control logic CLU2 controls the service session by controlling the charging unit in response to the messages received from the network and by sending control messages to the service provider and notification messages to the customer, in response to the signals from the charging logic. The control logic also has access to the service database SED and to the subscriber database SUD. The subscriber database contains the customer data for the operator that manages the control process unit (including the public key of each customer). The service database, in turn, contains information about the services offered by the service provider(s) and the charging parameters, such as the price. The service database is optional because the messages received from the service provider can also contain the information needed for charging purposes. An encryption block CM is associated with the message processing unit to verify the payment signatures. This block corresponds to the SL block of the terminal.

The control methods presented above can also be expanded to cover services that consist of several components. If the components originate from a single service provider, it is straightforward to employ the above control methods: price s is the sum of the component prices. If the components originate from separate service providers, then each service provider's interests may have to be overseen separately. This is explained in the following.

The components of a compound service may be priced separately, and they may even originate from separate service providers. Two examples of compound services are the transmission of data that requires several resource allocations from the network and the delivery of a multimedia presentation with components owned by several content providers.

Let us assume that a service consists of differently priced components and that the number of components, l, may change during the delivery time. Then s(t), P(t), C(t), and D(t) are 1-dimensional vectors, and each vector component corresponds to a service component. For example, $P(t)=(P_1(t), P_2(t), \ldots, P_l(t))$ and $C(t)=(C_1(t), C_2(t), \ldots, C_l(t))$, where the bold font indicates a vector. The arithmetic operations between vectors are performed in the usual way. If we assume that the debt is used as the control parameter, we obtain $$CP=D(t)=C(t)-P(t)=(C_1(t)-P_1(t), C_2(t)-P_2(t), \ldots, C_l(t)-P_l(t)).$$

In order to control the delivery of compound services, we need to define boolean relations, such as $>$ and $\geq$, between 1-dimensional vectors. It is natural to define that, for example, $D(t)>TT$ is true if $D_1(t)>TT_1 \vee D_2(t)>TT_2 \vee \ldots \vee D_l(t)>TT_l$. Then, by applying the known de Morgan's rule, we obtain that $(D(t) \leq TT = \neg(D(t)>TT)$ is true if $$D_1(t) \leq TT_1 \wedge D_2(t) \leq TT_2 \wedge \ldots \wedge D_l(t) \leq TT_l$$

Thus, with the defined arithmetic and boolean operations, the above-described control methods can be applied. Comparison of the control parameter of a service component to the corresponding threshold is straightforward, but one has to decide what to do when the threshold is exceeded. It is possible to either stop the delivery of all service components, or only those components that have exceeded their thresholds. Thus, the way the customer pays for one of the components in the compound service can affect the delivery of the whole service.

The same applies if we use the time in debt as the control parameter. We can redefine equation (5) as follows $$x(t) = \begin{cases} 1 & D(t) > 0 \\ 0 & \text{otherwise,} \end{cases}$$

$$\text{Now, the term } c(t) = \int_0^t x(\tau)d\tau$$

counts the times at which the debt is positive for at least one of the service components. Consequently, all service components are terminated when the threshold for c(t) is exceeded.

On the other hand, the time-in-debt can be separately defined for each service component, and each of the components may also have a different threshold for c(t): in this case the time in debt and the threshold are vectors: c(t) and TT. The service termination condition can be defined as c(t)>TT, i.e. the service is terminated if at least one of the debt-times exceeds the corresponding limit. It is also possible to cut off only those components that exceed their thresholds.

A more general termination condition for the whole service is F(c(t))>F(TT), where the function F(x) returns a real number. For example, F(x) may be a linear combination of the vector components xi. An important class of functions F are those that satisfy $\min\{xi\} \leq F(x) \leq \max\{xi\}$, $1 \leq i \leq l$. Arithmetic, geometric, and harmonic means are examples of such functions.

In the above, we have discussed only point-to-point connections, where the service is delivered only to one receiver. The method in accordance with the present invention can be used also in a multicast system, where a service is delivered to a group of customers.

There are both 1-to-n and n-to-n multicast schemes where there is either a single transmitter, usually called source, or all the members of the multicast group can transmit messages. In this context we discuss only one-to-many multicast, the service provider being the only transmitter. As shown in FIG. 12, the multicast tree consists of nodes vi and directed links (vi, vj) between the nodes, and the members of the multicast group are connected to the nodes. The nodes are actually routers and the members individual hosts. The subtree rooted in node vi consists of the local members (hosts in a subnetwork behind a router) and of the vj-based subtrees, where vj is directly linked to node vi. A multicast tree can be spanned with respect to many criteria: for example, the tree can be a unidirectional 1-to-n tree which uses the shortest possible paths, and a separate tree is spanned for each multicast group member that can send messages; or there can be one bidirectional tree which is used for all senders. For simplicity, here we consider only a source-based 1-to-n multicast tree.

Charging for multicast services includes two complex issues: how to allocate the charges to the group members and how to control that each member is paying his or her share. The costs come from the resources used in the network, in addition to the cost of producing the content. There are various ways for allocating the link costs and implementing the cost allocation scheme.

Once the costs have been allocated and a pricing policy has been used to determine the service charges for each member, it is natural to use a recursive method to control that the members are paying enough: each node vi controls its subtree and the source controls the whole multicast tree. To implement the control process in node vi, the above-described method for compound services can be applied; instead of having a single customer paying for many service components, there are many customers paying for the same service. Each vector component represents a node linked to vi or a local member of vi. The members do not have to send payment records at the same time as the other members; each member can send payments independently. A node can send payments further to the next node upstream when, for example, it has collected a certain amount of payments.

In multicast groups it is not sensible to detach all members who use node vi to receive multicast if only some of the local members or members downstream are not paying enough. Therefore, when the control parameter exceeds its threshold, only the members or nodes corresponding to the components i where $CP_i > TT_i$ should be cut off. The threshold for cutting off a node should be greater than the one cutting off a local member. In this way each node can remove non-paying local members before the whole subtree is detached from the multicast group.

As is obvious from the above, the control methods according to the present invention are also suitable for multicast services, the methods being applied on different hierarchical levels in the tree. In dynamical multicast groups, where members can join and leave the group during service delivery, the allocated costs and service prices are not constant. The control methods for compound and multicast services are also applicable to mutable prices.

The above described control methods can be used when charging for various services, e.g. streaming media, access to the Internet, and the above-described compound and multicast services.

Should the customer pay extra, it can be dealt with in two ways: online and offline. The control process can online notify the customer that he or she is paying in excess and should take this into account when sending more payments. After the charging session, the customer can be billed less than he has authorized the service provider to do or the extra sum, especially if it is in electronic money, can be returned to the customer.

Although the invention has been described above with reference to the examples shown in the attached drawings, it is obvious that the invention is not limited to these examples but can be varied within the limits set by the attached patent claims. A brief description of conceivable variations is provided below.

For example, it is possible that the terminal need not send the actual payment but some other (payment-related) messages to the charging server, which the receiving entity can then use for generating the payment messages itself. For example, the terminal can send so-called keep-alive messages for the duration of the service, and the control process may generate the payment messages. Similarly, it is possible, particularly in systems that support terminal mobility, that some other network element or entity assumes the role of the terminal as the generator of the payment messages. Such an element or entity must enjoy the user's fill confidence. Assuming the role of the terminal can, for example, be effected by having the terminal pay a certain lump sum to the said element or entity, which then maintains the service connection in accordance with the payment received and possibly requests additional payments from the customer terminal. One user may also pay in real time for the delivery of service to another user.

What is claimed is:

1. A method for controlling service provision for customer terminals, used by customers for receiving services, in a telecommunications network including at least one server for offering services to the customers, and control means for controlling the provision of services to customers, the method comprising the steps of:

continuously providing a service by transmitting information to the customer terminal;

receiving information about service-specific payments in the control means from the customer terminal during delivery of the service;

informing the control means of the current price of the service;

maintaining at least one control parameter value is dependent at least on a difference of accumulated charges for the service and accumulated sum of service-specific payments, the service being unpaid for when the accumulated charges are larger than the accumulated sum of the service-specific payments;

comparing the value of at least one of said at least one control parameter to a first threshold, the first threshold defining an amount of unpaid service that a customer receives;

stopping the continuous provision of the service when the value of the control parameter has reached the first threshold;

sending to the customer terminal a notification of a lost payment; and receiving a re-sent payment from the customer terminal.

2. A method according to patent claim 1, wherein at least two control parameters are maintained, said method comprising:

determining at least one threshold for each control parameter, and stopping the service when the value of a certain control parameter exceeds a certain first threshold corresponding to that control parameter.

3. A method according to patent claim 1, comprising:

comparing the value of one of said at least one control parameter to a second threshold and sending a notification to the customer terminal when the value of the control parameter reaches the second threshold.

4. A method according to patent claim 3, wherein said one control parameter is the control parameter whose value is used to stop the service, whereby said second threshold is smaller than said first threshold.

5. A method according to patent claim 1, wherein at least one of said at least one control parameter represents the debt incurred by the customer.

6. A method according to patent claim 4, comprising:
calculating the value of the control parameter after each service-specific payment,
comparing the control parameter to a third threshold, and
sending a notification to the customer terminal when the value of the control parameter has reached said third threshold.

7. A method according to patent claim 1, comprising using a control parameter which represents the amount of time that the customer has been in debt to the service provider.

8. A method according to patent claim 1, wherein at least one of said at least one control parameter represents the ratio of the duration during which the customer has been in debt to the service provider to the duration during which the customer has not been in debt to the service provider.

9. A method according to patent claim 1, wherein a first and second control parameter are maintained, said method comprising:
determining at least one threshold value for both control parameters so that one of the parameter-specific values represents a stop value, and
stopping the service when the value of either control parameter reaches the stop value corresponding to it.

10. A method according to patent claim 9, wherein the first control parameter represents the debt incurred by the customer and a second control parameter represents the amount of time that the customer has been in debt to the service provider.

11. A method according to patent claim 1, wherein a first and second control parameter are maintained, said method comprising:
determining a first threshold for the first control parameter and a second control threshold for the second control parameter,
changing the first threshold value when the value of the second control parameter exceeds the second threshold value, and
stopping the service when the value of the first control parameter reaches the first threshold value.

12. A method according to patent claim 1, comprising changing the price of the service on the basis of the value of one of said at least one control parameter.

13. A method according to patent claim 12, the price of the service is changed on the basis of the value of the control parameter which is used to stop the service.

14. A method according to patent claim 1, comprising determining the value of at least one of said at least one control parameter on the basis of the current service session only.

15. A method according to patent claim 1, comprising storing data concerning the service session of the customer and using the data relating to at least one previous service session of the current customer when determining the value of at least one of said at least one control parameter during the current service session.

16. A method according to patent claim 1, comprising using timers to indicate when the value of at least one of said at least one control parameter will reach a threshold value.

17. A method according to patent claim 1, comprising:
calculating the value of at least one of said at least one control parameter periodically at predetermined moments of time,
storing the changes in the service price, which occur between two consecutive moments, and the moments of time corresponding to each change, and
using the stored information when calculating the value of said at least one control parameter.

18. A method according to patent claim 1, comprising calculating the value of at least one of said at least one control parameter periodically and also when the price of the service changes and when a service-specific payment is received.

19. A method according to patent claim 1, wherein the service comprises one information flow transmitted to several customers, said method comprising:
maintaining customer-specific thresholds,
maintaining customer group-specific thresholds, and
choosing the values of said thresholds so that the information flow to the customer can be stopped before the information flow to the entire customer group is stopped.

20. A method according to patent claim 1, wherein the service comprises one information flow transmitted to several customers, said method comprising:
storing data concerning the service session of a customer group and using the data relating to at least one previous service session of the current customer group when determining the value of the control parameter during the current service session.

21. A method for controlling service provision for customer terminals, used by customers for receiving services, in a telecommunications network including at least one server for offering services to the customers, and control means for controlling the provision of services to customers, the method comprising the steps of:
continuously providing a service by transmitting a plurality of information flows to the customer terminal;
receiving information about information-flow-specific payments in the control means from the customer terminal during delivery of the service;
informing the control means of the current price of the information flows;
maintaining for each information flow at least one control parameter whose value is dependent at least on a difference of accumulated charges for the information flow and accumulated sum of information-flow-specific payments, an information flow being unpaid for when the accumulated charges for the information flow are larger than the accumulated sum of information-flow-specific payments;
comparing, for each information flow, the value of at least one of said at least one control parameter to an information-flow-specific threshold, the information-flow-specific threshold defining an amount of unpaid information-flow-specific that a customer receives;
stopping said plurality of information flows if the control parameter value of at least one of the information flows reaches the threshold corresponding to it;
sending to the customer terminal a notification of a lost payment; and
receiving a re-sent payment from the customer terminal.

22. A method for controlling service provision for customer terminals, used by customers for receiving services, in a telecommunications network including at least one server for offering services to the customers, and control means for controlling the provision of services to customers, the method comprising the steps of:

continuously providing a service by transmitting a plurality of information flows to the customer terminal;

receiving information about information-flow-specific payments in the control means from the customer terminal during delivery of the service;

informing the control means of the current price of the information flows;

maintaining for each information flow at least one control parameter whose value is dependent at least on a difference of accumulated charges for the information flow and accumulated sum of information-flow-specific payments, an information flow being unpaid for when the accumulated charges for the information flow are larger than the accumulated sum of information-flow-specific payments;

comparing, for each information flow, the value of at least one of said at least one control parameter to an information-flow-specific threshold, the information-flow-specific threshold defining an amount of unpaid information-flow-specific that a customer receives;

stopping only a single information flow when the control parameter value of said information flow reaches the corresponding threshold;

sending to the customer terminal a notification of a lost payment; and receivig a re-sent payment from the customer terminal.

23. A system for controlling service provision to customer terminals, used by customers for receiving services, in a telecommunications network including at least one server for offering services to the customer, and control means for controlling the provision of the service to a customer, the system comprising:

first means for continuously providing services by transmitting information to customer terminals;

second means for receiving information about service-specific payments from customer terminals during delivery of services in the control means;

third means for informing the control means of the current price of the service, and said control means comprising first control means for maintaining for the service at least one control parameter whose value is dependent at least on a difference of accumulated charges for the service and accumulated sum of service-specific payments, the service being unpaid for when the accumulated charges are larger than the accumulated sum of service-specific payments;

comparison means for comparing the value of a control parameter to a first predetermined threshold value, the first threshold defining an amount of unpaid service that the customer receives; and second control means for stopping the continuous provision of the service when the value of the control parameter has reached the first threshold, wherein the customer terminal receives a notification of a lost payment and a re-sent payment is sent from the customer terminal.

24. A system according to patent claim 23, comprising a customer terminal configured to receive services, make service-specific payments for services and send information about said service-specific payments to the control means.

* * * * *